US012754313B2

(12) United States Patent
Heller

(10) Patent No.: US 12,754,313 B2
(45) Date of Patent: Oct. 6, 2026

(54) DEVICE FOR DETERMINING AN ORIENTATION OF A SENSOR INSTALLED ON A BUMPER OF A MOTOR VEHICLE

(71) Applicant: Bayerische Motoren Werke Aktiengesellschaft, Munich (DE)

(72) Inventor: Martin Heller, Graben (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 125 days.

(21) Appl. No.: 18/844,150

(22) PCT Filed: Feb. 21, 2023

(86) PCT No.: PCT/EP2023/054310
§ 371 (c)(1),
(2) Date: Sep. 5, 2024

(87) PCT Pub. No.: WO2023/179996
PCT Pub. Date: Sep. 28, 2023

(65) Prior Publication Data

US 2025/0180738 A1 Jun. 5, 2025

(30) Foreign Application Priority Data

Mar. 24, 2022 (DE) ..................... 10 2022 106 922.2

(51) Int. Cl.
*G01S 15/931* (2020.01)

(52) U.S. Cl.
CPC ....... *G01S 15/931* (2013.01); *G01S 2015/932* (2013.01); *G01S 2015/938* (2013.01)

(58) Field of Classification Search
CPC .... G01S 7/52004; G01S 7/521; G01S 15/931; G01S 2015/938; G01S 2015/932;
(Continued)

(56) References Cited

U.S. PATENT DOCUMENTS 5,475,932 A * 12/1995 Matsuhashi .............. G01D 5/25 33/561
5,870,835 A * 2/1999 Stieff ....................... G01B 3/28 33/832
(Continued)

FOREIGN PATENT DOCUMENTS

DE 10 2004 020 436 A1 9/2004
WO WO 2014/014940 A1 1/2014

OTHER PUBLICATIONS

International Search Report (PCT/ISA/210) issued in PCT Application No. PCT/EP2023/054310 dated May 22, 2023 with English translation (7 pages).
(Continued)

*Primary Examiner* — Isam A Alsomiri
*Assistant Examiner* — Amie M Ndure
(74) *Attorney, Agent, or Firm* — Crowell & Moring LLP

(57) ABSTRACT

A device for determining an orientation of a sensor installed on the body of a motor vehicle is provided, in which the sensor having a planar surface is accessible from the outside. The device includes an elongate main body, with the main body having a planar contact face at one end and, at the other end, at least one recess for receiving at least one measuring bar. The elongate recess is designed such that a longitudinal axis of the recess runs perpendicular to a longitudinal axis of the main body. The planar contact face of the main body is designed such that the longitudinal axis of the main body runs parallel to a normal vector of the planar surface of the sensor when the planar contact face of the main body is in surface contact with the planar surface of the sensor.

17 Claims, 1 Drawing Sheet

(58) Field of Classification Search
CPC ........ G01S 17/931; G01S 7/497; G01S 17/86; G01S 7/4972; G01S 13/931; G01S 7/4026; A61B 3/101; G06T 7/136; G06T 7/13; G06T 7/0012; G06T 2207/30041; B60O 1/525; B60K 2370/90
See application file for complete search history.

(56) References Cited

U.S. PATENT DOCUMENTS

| | | | | |
|---|---|---|---|---|
| 6,809,806 | B1 | 10/2004 | Carnevale et al. | |
| 8,081,539 | B2 * | 12/2011 | Faber | G01S 15/931 367/902 |
| 9,651,349 | B2 * | 5/2017 | Blain | G01B 3/30 |
| 10,871,553 | B2 | 12/2020 | Ohmoto | |
| 11,960,024 | B2 * | 4/2024 | Kohn | G01S 17/931 |
| 2002/0061721 | A1 | 5/2002 | Himeno et al. | |
| 2002/0189123 | A1 * | 12/2002 | Denzel | F15B 15/2846 33/706 |
| 2009/0249878 | A1 * | 10/2009 | Faber | G01S 7/52006 340/932.2 |
| 2010/0011870 | A1 * | 1/2010 | Landwehr | G01L 19/14 73/756 |
| 2018/0364329 | A1 * | 12/2018 | Ohmoto | G01S 7/02 |
| 2020/0116836 | A1 * | 4/2020 | Pacala | G01J 3/0224 |
| 2021/0018629 | A1 | 1/2021 | Kohn | |

OTHER PUBLICATIONS

German-language Written Opinion (PCT/ISA/237) issued in PCT Application No. PCT/EP2023/054310 dated May 22, 2023 with English translation (10 pages).
German-language Search Report issued in German Application No. 10 2022 106 922.2 dated Nov. 14, 2022 with English translation (12 pages).
“Instructions for the Vertical and Lateral Alignment of Bendix Radar Sensors”, Bendix Commercial Vehicle System LLC, Sep. 1, 2011, pp. 1-6, XP007922332 (6 pages).
“Rechtsakte Von Gremien, Die Im Rahmen Internationaler Übereinkünfte Eingesetzt Wurden”, In Official Journal of the European Union Legislation, May 25, 2021, pp. 20-61, vol. 64, H. 184 (42 pages).

* cited by examiner

DEVICE FOR DETERMINING AN ORIENTATION OF A SENSOR INSTALLED ON A BUMPER OF A MOTOR VEHICLE

BACKGROUND AND SUMMARY

The present invention relates to a device for determining an orientation of a sensor installed on a body of a motor vehicle, and also to a kit of parts exhibiting the device.

In modern motor vehicles, particularly in automobiles, driver-assistance systems designated as parking aids (park distance control, PDC) are being installed to an increased extent, these systems being intended to facilitate the parking of the motor vehicle, particularly in a tight space.

For this purpose, ultrasound-based systems, for instance, are known from the prior art. These systems operate with ultrasonic sensors that have been integrated into a front and/or rear bumper of the motor vehicle. A distinction is made between two-channel, four-channel, six-channel, eight-channel and twelve-channel systems, which means that two, four or six round ultrasonic sensors have been incorporated per bumper. These sensors send and receive ultrasonic signals and communicate the data obtained to a control unit which calculates, from a transit-time of the ultrasonic signal, a distance of the motor vehicle from an object reflecting ultrasonic signals.

In order to be able to determine the distance correctly, it is necessary that the ultrasonic sensors have been orientated in correctly aligned manner—that is to say, in a predetermined manner.

In particular in the case of rear-end collisions and/or cases of minor damage when parking, the bumper itself may be substantially undamaged, but the orientation of the ultrasonic sensors may have changed, which may result in an at least restricted functionality of the parking aid as a result of misaligned sensors.

In addition, the operational capability of the parking aid is examined during a development process carried out by a manufacturer of the motor vehicle, for example within the scope of a so-called homologation. Such a homologation of the parking aid, which also requires an exact orientation of the sensors within a tolerance range of a few degrees, is necessary, in particular, as a result of laws that have recently come into being, such as UNECE R158 and the adaptation thereof.

In both cases—that is to say, in the field (for example, after an accident) and during development (for example, for homologation purposes)—the orientation of the sensors can only be determined with great effort using means known from the prior art. Determining the orientation is possible only with difficulty, by reason of the relatively small surface area of the sensor and, in some cases, the recessed installation position. It therefore also does not become apparent immediately—to be more exact, with the naked eye—whether a sensor has been shifted out of position. In addition, in the field or in workshops often a suitable and usually cost-intensive measuring instrument for determining spatial attitude—to be more exact, for determining orientation—is in some cases not available and/or not capable of being employed economically.

Against the background of this prior art, the object of the present invention consists in specifying a device that is suitable to overcome at least the aforementioned disadvantages of the prior art.

The object is achieved by virtue of the features of the independent claim. The dependent claims have preferred developments of the invention as their subject-matter.

According to these claims, the object is achieved by a device for determining an orientation of a sensor installed on a body, in particular on a bumper, of a motor vehicle, the sensor exhibiting a flat plane which is accessible from outside.

The device includes an elongated main body, the main body exhibiting a flat contact surface at one end and at least one recess for accommodating at least one measuring rod at the other end. The elongated recess has been formed in such a way that a longitudinal axis of the recess extends perpendicular to a longitudinal axis of the main body. The flat contact surface of the main body has been formed in such a way that the longitudinal axis of the main body extends parallel to a normal vector of the flat plane of the sensor when the flat contact surface of the main body is in planar contact with the flat plane of the sensor.

By virtue of the described device, a cost-effective tool can be utilized and made available that solves the problems, described in the introduction, of the determination of the orientation of the sensor, so that an incorrect orientation after repairs, accidents and/or assembly can be detected very easily. Consequently, faults can be pointed out very easily, for example during a homologation, the response can be quick, and a homologation by technical services can be passed successfully.

The sensor may be, for example, an ultrasonic sensor, described in the introduction, of a parking aid, which, for example, may have been installed in a front and/or rear bumper of the motor vehicle. However, the disclosure is not limited to such sensors. Rather, the sensor may be of any type that exhibits a flat plane and has been installed in and/or on the motor vehicle in such a way that the flat contact surface of the device is capable of being brought into contact with the flat surface of the sensor.

The flat plane of the sensor may also be designated as the flat (contact) surface. The respective end of the main body may also be designated as the end piece or end region.

By a "flat (contact) surface", a level, even—that is to say, non-curved—outer surface of a device may be understood.

Since the at least one recess has been designed to accommodate at least one measuring rod, an aperture of the recess has been arranged in such a way that the measuring rod is capable of being inserted into the recess from outside in such a way that, when of appropriate length, the measuring rod is visible from outside—that is to say, it protrudes from the recess toward the outside. The recess is consequently shorter than the measuring rod.

By a "normal vector", a vector is understood that is orthogonal (that is to say, at right angles, perpendicular) to the respective surface or plane. A straight line having this vector as direction vector is called a "normal". Since the flat contact surface of the main body has been formed in such a way that the longitudinal axis of the main body extends parallel to the normal vector of the flat plane of the sensor when the flat contact surface of the main body is in planar contact with the flat plane of the sensor, the longitudinal axis of the main body constitutes an extension of a sensor axis. This permits the spatial attitude, or orientation, of the sensor axis, and hence of the sensor, to be determined by means of measuring rods that are capable of being inserted into the recess.

The device may have been manufactured from various materials such as, for example, wood and/or synthetic material. It is conceivable that the device is capable of being produced by means of a method of additive manufacturing, in particular by means of 3D printing.

Optional developments of the device described above are described in detail in the following.

A normal vector of the flat contact surface of the main body may extend parallel to the longitudinal axis of the main body. The normal vector of the flat contact surface of the main body may extend parallel to the normal vector of the flat plane of the sensor when the flat contact surface of the main body is in planar contact with the flat plane of the sensor.

The at least one recess may take the form of a blind hole or through-hole.

The device may further exhibit the at least one measuring rod which is cylindrical and has been accommodated and fixed in the at least one recess in such a way that a longitudinal axis of the at least one measuring rod extends perpendicular to the longitudinal axis of the main body.

The device may exhibit four of the at least one recess described above. The four recesses can each accommodate, in the manner described above, a measuring rod, likewise described above. The four recesses may have been arranged with a separation of, in each instance, 90° relative to one another. In this case, the recesses preferably take the form of blind holes, the respective longitudinal axes of which enclose an angle of 90°.

The device may exhibit two of the at least one recess described above. The two recesses can each accommodate, in the manner described above, a measuring rod, likewise described above. The two recesses may have been arranged with a separation of 90° relative to one another. In this case, the recesses preferably take the form of through-holes, the respective longitudinal axes of which enclose an angle of 90°.

The main body may be cylindrical. Additionally or alternatively, the main body may exhibit a narrowing in a region between the one end, at which the flat contact surface has been formed, and the other end, at which the at least one recess has been formed. Additionally or alternatively, the main body may have a length of 2 cm to 4 cm.

The main body may exhibit on the flat contact surface an adhesive element for detachable fastening of the device to the flat plane of the sensor.

The device may exhibit a cord, weighted with a weight, which has been fastened to the end of the main body at which the at least one recess has been formed.

The main body may exhibit a further flat contact surface which has been formed at the other end of the main body, at which the at least one recess has been formed, the normal vector of which extends parallel to a longitudinal axis of the main body.

Furthermore, a kit of parts is made available that exhibits the device described above and at least one measuring rod, for accommodation in the at least one recess of the device, and/or an angle-measuring apparatus for contacting the further flat contact surface of the main body.

The spatial juxtaposition of the functionally coordinated individual components is therefore protected. But the disclosure is not limited thereto, and a system may, for example, also be made available in which the angle-measuring apparatus, which may have been implemented in analog and/or digital form, is in contact with the further flat surface of the device. Additionally or alternatively, the disclosure also relates to a use of the device and/or of the kit of parts for the purpose of determining the orientation of the sensor. It is conceivable that the sensor is also part of the system and/or of the kit of parts. What has been described above with reference to the device also applies analogously to the system, to the kit of parts, and to the use of the device.

What has been described above may be summarized using different words and with reference to a more concrete embodiment as described in the following, this merely comprising a description of optional features and not restricting the disclosure.

The disclosure is based on the principle of describing an orientation aid that is capable of being produced easily—for example, capable of being produced in a 3D printing method—and that is applied flat using reversible means—for example, an adhesive pad—onto the midpoint of a PDC sensor installed in a bumper. By virtue of a double-sided, detachable adhesive pad, the flat surface of the measuring aid can consequently be applied onto the flat surface of the PDC sensor and held temporarily. By virtue of the cylindrical shape of the measuring aid, this is also possible in the case of PDC sensors incorporated in recessed manner. In this case, the flat surface of the orientation aid has planar contact with the sensor and constitutes the extension of the sensor axis. Conduits of the orientation aid, arranged exactly at a right angle, preferentially accommodate two straight, readily visually detectable bars which visually signal the installation attitude of the sensors in relation to the bumper. By extension of the axes, even a small deviation of the spatial attitude becomes capable of being detected visually by eye and can, for example, be repaired in a specialist workshop. The measuring aid, or orientation aid, has been constructed as a cylinder with flat surfaces, a narrowing of the cylinder serving for reducing the mass of the orientation aid. The system can be created by means of 3D rapid prototyping, in order in this way to be able to distribute it quickly worldwide. The narrowed cylinder corresponds from the base area to the surface area of a conventional PDC sensor (about 1.2 cm). In order to reduce a lever action, the extension of the axis of the PDC sensor has to be reduced to a necessary minimum (for example, 2 cm to 4 cm). This offers sufficient degrees of freedom for an orientation. In the cylinder, in extension of the axis, there are two conduits, offset by 90° and guided parallel to the bearing surface, into which measuring rods or depth-ascertaining rods can be inserted in exactly positioned manner. The depth-ascertaining rods that are employed should be balanced in terms of length and weight. A length of 20 cm is consequently sufficient. The depth-ascertaining rods may be constructed from wood or from lightweight, stable synthetic materials or glass fiber. The diameter of the depth-ascertaining rods here ranges here from about 2 mm to 4 mm. The depth-ascertaining rods that are employed simulate the horizontal and vertical axes of the orientation of the sensor. In the case of a temporarily fastened measuring aid, a position in the vertical position and in the horizontal position relative to the vehicle axis is easily possible by virtue of the visual ascertainment of the depth of the measuring rods. The surface of the measuring aid has likewise been constructed to be parallel to the base surface, in order to create here a hydrostatic balance electronically or conventionally with bubble level, and consequently to be able to determine exactly the deviation even of recessed sensors relative to the earth's axis. In addition, the system has been constructed to be capable of being disassembled easily. By this means, storage and transportation are possible with little effort. In principle, it is conceivable to make the device available in the form of a kit.

An embodiment will be described in the following with reference to FIG. 1.

DETAILED DESCRIPTION OF THE DRAWINGS

In the following description of the Figures the same reference symbols will be used for the same objects in FIGS. 1 and 2.

Figure 1:
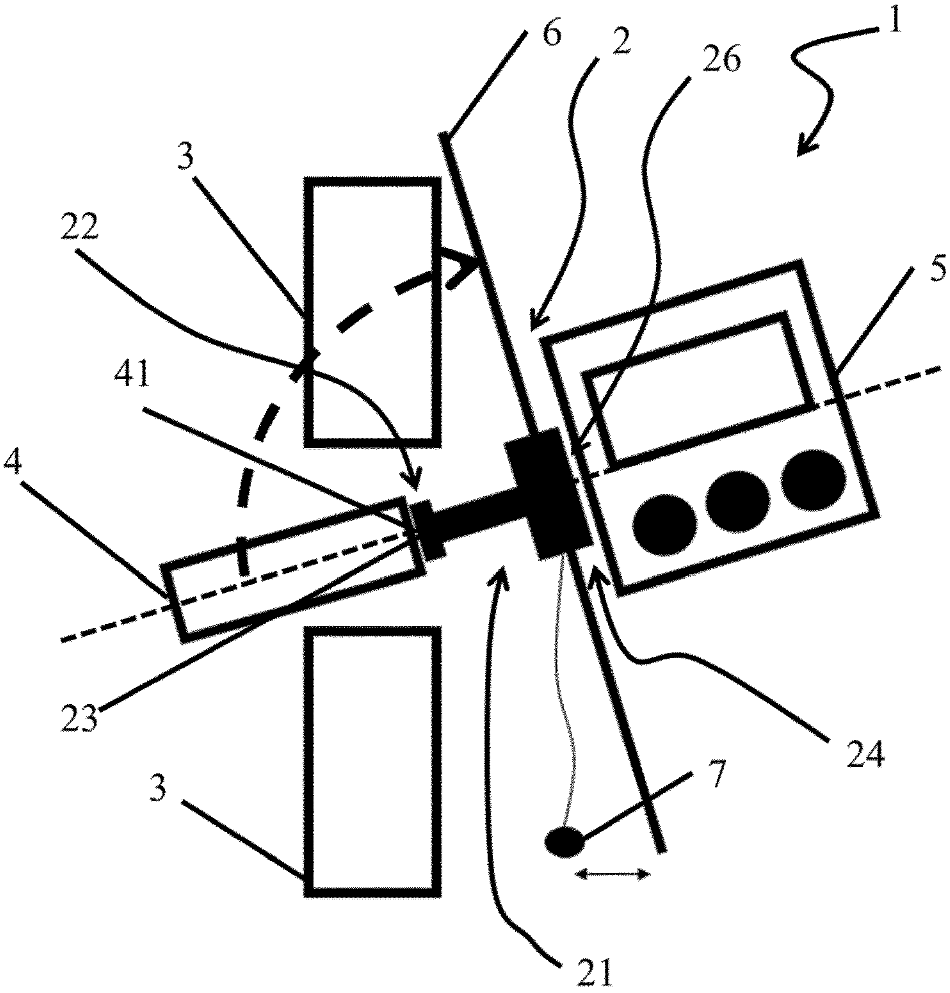
FIG. 1 shows schematically a system exhibiting a device for determining an orientation of a sensor installed on a bumper of a motor vehicle, in a side view.
Figure 2:
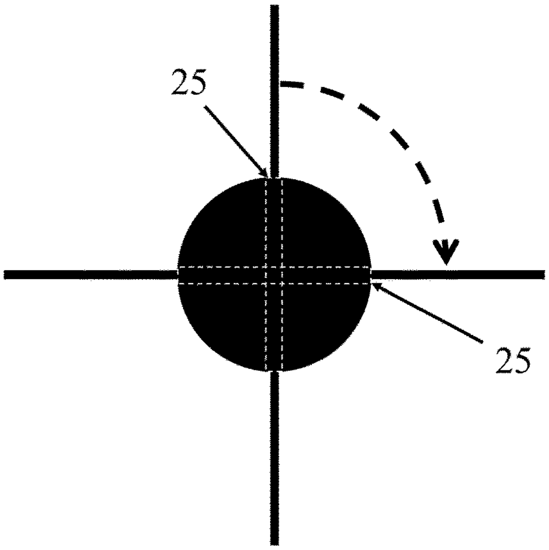
FIG. 2 shows schematically the device from FIG. 1 in a plan view.

The system 1 represented in FIG. 1 exhibits a device 2 for determining an orientation of a sensor 4 installed on a bumper 3 of a motor vehicle (not represented in any detail). The system 1 includes, in addition to the device 2, an angle-measuring instrument 5.

The sensor 4 exhibits a flat plane 41 which is accessible from outside. The device 2 includes an elongated main body 21, the main body 21 at one end 22 a flat contact surface 23 and at the other end 24 two recesses 25 taking the form of through-holes (indicated schematically in FIG. 2), which accommodate one of a total of two measuring rods 6. It would also be conceivable to form one of the recesses 25 as a blind hole and to provide four measuring rods 6.

The elongated recesses 25 have each been formed in such a way that a longitudinal axis of the recess 25, which extends parallel to the respective measuring rod 6, extends perpendicular to a longitudinal axis 26 (dashed line in FIG. 1) of the main body 21.

The flat contact surface 23 of the main body 21 has been formed in such a way that the longitudinal axis of the main body 21 extends parallel to a normal vector of the flat plane 41 of the sensor 4, or to a sensor axis, when the flat contact surface 23 of the main body 21 is in planar contact with the flat plane of the sensor 4 (see dashed line in FIG. 1, which represents a spatial attitude both of the longitudinal axis of the main body 21 and of the sensor axis). A normal vector of the flat contact surface 23 of the main body 21 has likewise been formed parallel to the longitudinal axis of the main body 21, and the normal vector of the flat contact surface 23 of the main body 21 has consequently been formed parallel to the normal vector of the flat plane 41 of the sensor 4 when the flat contact surface 23 of the main body 21 is in planar contact with the flat plane 41 of the sensor 4 (see also dashed line in FIG. 1).

As is evident from FIG. 1, the main body 21 exhibits a narrowing for the purpose of saving material in a region between the one end 22, at which the flat contact surface 23 has been formed, and the other end 24, at which the two recesses 25 have been formed. The main body, which is dumbbell-shaped by reason of the narrowing, has a length of about 3 cm in the present case.

The main body 21 exhibits, in addition, on the flat contact surface 23 an adhesive element (not represented) for detachable fastening of the device 1 to the flat plane 41 of the sensor 4.

The measuring rods 6, just like the main body 21, are each cylindrical and have been accommodated and fixed in the respective recess 25 in such a way that a longitudinal axis of the measuring rods 6 extends in each instance perpendicular to the longitudinal axis of the main body 21 (the angle of 90° is indicated in FIG. 1 by the dashed, arcuate arrow). The longitudinal axes of the two recesses 25 have been arranged with a separation of 90° relative to one another (the angle of 90° is indicated in FIG. 1 by the dashed, arcuate arrow).

The measuring rods 6 permit an ascertainment of whether the sensor axis has been rotated relative to the vertical (as represented by way of example in FIG. 1) and/or the horizontal if the measuring rods 6 do not extend parallel to the vertical or the horizontal. In order to determine the angle between the measuring rod 6 and the vertical, the device exhibits a weight, or plumb line, 7 which has been fastened via a cord to the end of the main body 21 at which the recesses 25 have been formed. By means of a ruler, a distance (see double-headed arrow in FIG. 1) of the measuring rod 6 from the weight 7 can be calculated, and, through knowledge of the dimension of the cord and/or of the measuring rod, the angle that the measuring rod 6 includes with the vertical can be calculated.

Furthermore, the main body 21 exhibits a further flat contact surface 26 which has been formed at the other end of the main body 21, at which the recesses 25 have been formed, the normal vector of which also extends parallel to the longitudinal axis of the main body 21 (again see dashed line in FIG. 1). The angle-measuring apparatus 5 (in the present case, for example, an electronic angle-measuring apparatus) can be brought into contact with the flat surface 26 of the main body 21, in order in this way to determine an angle of the sensor axis relative to the horizontal and the vertical.

LIST OF REFERENCE SYMBOLS

1 system
2 device for determining the orientation of the sensor
21 main body
22 first end
23 first flat surface or contact surface
24 second end
25 recesses for measuring rods
26 second flat surface
3 bumper
4 sensor
41 flat surface
5 angle-measuring apparatus
6 measuring rod
7 plumb line

The invention claimed is:

1. A device for determining an orientation of a sensor installed on a body of a motor vehicle, wherein the sensor includes a flat plane which is accessible from outside, the device comprising:

an elongated main body that includes a flat contact surface at one end; and an elongated recess for accommodating a measuring rod at another end;

wherein the recess is formed in such a way that a longitudinal axis of the recess extends perpendicular to a longitudinal axis of the main body;

wherein the flat contact surface of the main body is formed in such a way that the longitudinal axis of the main body extends parallel to a normal vector of the flat plane of the sensor when the flat contact surface of the main body is in planar contact with the flat plane of the sensor;

wherein the main body is cylindrical;

wherein the main body includes a narrowing in a region between the one end, at which the flat contact surface is been formed, and the other end, at which the recess is formed; and wherein the main body has a length of 2 cm to 4 cm.

2. The device according to claim 1, wherein a normal vector of the flat contact surface of the main body extends parallel to the longitudinal axis of the main body, and the normal vector of the flat contact surface of the main body extends parallel to the normal vector of the flat plane of the sensor when the flat contact surface of the main body is in planar contact with the flat plane of the sensor.

3. The device according to claim 2, wherein the at least one recess is a blind hole or a through-hole.

4. The device according to claim 3, wherein the device includes two or four of the recess, each of which includes one of the measuring rod, which are arranged with a separation of 90° relative to one another.

5. The device according to claim 3, wherein
the main body is cylindrical,
the main body includes a narrowing in a region between the one end, at which the flat contact surface is been formed, and the other end, at which the recess is formed, and
the main body has a length of 2 cm to 4 cm.

6. The device according to claim 2, wherein the device further includes the measuring rod, which is cylindrical and is accommodated and fixed in the recess in such a way that a longitudinal axis of the measuring rod extends perpendicular to the longitudinal axis of the main body.

7. The device according to claim 2, wherein the device includes two or four of the recess, each of which includes one of the measuring rod, which are arranged with a separation of 90° relative to one another.

8. The device according to claim 1, wherein the at least one recess is a blind hole or a through-hole.

9. The device according to claim 8, wherein the device further includes the measuring rod, which is cylindrical and is accommodated and fixed in the recess in such a way that a longitudinal axis of the measuring rod extends perpendicular to the longitudinal axis of the main body.

10. The device according to claim 8, wherein the device includes two or four of the recess, each of which includes one of the measuring rod, which are arranged with a separation of 90° relative to one another.

11. The device according to claim 1, wherein the device further includes the measuring rod, which is cylindrical and is accommodated and fixed in the recess in such a way that a longitudinal axis of the measuring rod extends perpendicular to the longitudinal axis of the main body.

12. The device according to claim 11, wherein
the main body is cylindrical,
the main body includes a narrowing in a region between the one end, at which the flat contact surface is been formed, and the other end, at which the recess is formed, and
the main body has a length of 2 cm to 4 cm.

13. The device according to claim 1, wherein the device includes two or four of the recess, each of which includes one of the measuring rod, which are arranged with a separation of 90° relative to one another.

14. The device according to claim 1, wherein the main body includes on the flat contact surface an adhesive element for detachable fastening of the device to the flat plane of the sensor.

15. The device according to claim 1, wherein the device includes a cord, weighted with a weight, which has been fastened to the end of the main body at which the recess is formed.

16. The device according to claim 1, wherein the main body includes a further flat contact surface which is formed at the end of the main body at which the recess has been formed, the normal vector of which extends parallel to the longitudinal axis of the main body.

17. A kit of parts including the device according to claim 16 together with the measuring rod, for accommodation in the recess of the device, and/or, with an angle-measuring apparatus for contacting the further flat contact surface of the main body.

* * * * *